(12) United States Patent
Po et al.

(10) Patent No.: US 8,055,025 B2
(45) Date of Patent: Nov. 8, 2011

(54) MOTION ESTIMATION METHOD

(75) Inventors: Lai-Man Po, Hong Kong (CN); Ka-Ho Ng, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 816 days.

(21) Appl. No.: 12/139,469

(22) Filed: Jun. 14, 2008

(65) Prior Publication Data

US 2009/0310875 A1    Dec. 17, 2009

(51) Int. Cl.
*G06K 9/00* (2006.01)
*H04N 11/02* (2006.01)
(52) U.S. Cl. ............ 382/107; 382/291; 375/240.16
(58) Field of Classification Search ............ 482/100, 482/103, 106, 107, 168, 172, 173, 181, 199, 482/232, 233, 243, 254, 274, 275, 276, 286–299, 482/312; 375/240.16, 240.12, 240.2; 348/402.1, 348/407.1
See application file for complete search history.

(56) References Cited

U.S. PATENT DOCUMENTS

| | | | | |
|---|---|---|---|---|
| 5,949,486 | A * | 9/1999 | Ishihara et al. | 348/402.1 |
| 6,876,702 | B1 * | 4/2005 | Hui et al. | 375/240.16 |
| 7,224,731 | B2 * | 5/2007 | Mehrotra | 375/240.16 |
| 7,227,896 | B2 * | 6/2007 | Sun | 375/240.16 |
| 7,471,724 | B2 * | 12/2008 | Lee | 375/240.12 |
| 8,000,392 | B1 * | 8/2011 | Krupiczka et al. | 375/240.16 |

OTHER PUBLICATIONS

Tham, J. Y. et al., "A novel unrestricted center-biased diamond search algorithm for block motion estimation," IEEE Trans. on Circuits and Systems for Video Technology.*
Srinivasan, R. et al., "Predictive coding based on efficient motion estimation," *IEEE Trans. Commun.*, vol. COM-33, pp. 888-896, Aug. 1985.
Koga, T. et al., "Motion compensated interframe coding for video conferencing," in *Proc. Nat. Telecommun, Con., NO, L.A.*, Nov.-Dec. 1981, pp. G5.2.1-G5.3.5.
Li, R. et al., "A new three-step search algorithm for block motion estimation," *IEEE Trans. on Circuits and Systems for Video Technology*, vol. 4, pp. 438-443, Aug. 1994.
Po, L. M. et al., "A novel four-step search algorithm for fast block motion estimation," *IEEE Trans. on Circuits and Systems for Video Technology*, vol. 6, pp. 313-317, Jun. 1996.

(Continued)

*Primary Examiner* — Seyed Azarian
(74) *Attorney, Agent, or Firm* — Leydig, Voit & Mayer, Ltd.

(57) ABSTRACT

A motion estimation method uses a search start point and a plurality of search paths extending from the start point. The method finds an image point along the plurality of search paths that has a minimum comparison value with a reference image block. This image point with a minimum comparison value becomes the new search start point, with a plurality of new search paths extending from the new start point. The method then finds the image point along the plurality of new search paths that has a minimum comparison value with the reference image block. The cycle repeats until points on the search paths have comparison values higher than the start point.

13 Claims, 4 Drawing Sheets

First Iteration of One-at-a-Time Search in Eight Directions

OTHER PUBLICATIONS

Liu, L. K. et al., "A block-based gradient descent search algorithm for block motion estimation in video coding," *IEEE Trans. on Circuits and Systems for Video Technology*, vol. 6, pp. 419-422, Aug. 1996.

Tham, J. Y. et al., "A novel unrestricted center-biased diamond search algorithm for block motion estimation," *IEEE Trans. on Circuits and Systems for Video Technology*, vol. 8, pp. 369-377, Aug. 1998.

Zhu, C. et al., "Hexagon-based search pattern for fast block motion estimation," *IEEE Trans. on Circuits and Systems for Video Technology*, vol. 12, pp. 349-355, May 2002.

Cheung, C. H. et al., "A novel cross-diamond search algorithm for fast block motion estimation," *IEEE Trans. on Circuits and Systems for Video Technology*, vol. 12, pp. 1168-1177, Dec. 2002.

Cheung, C. H. et al., "Novel cross-diamond-hexagonal search algorithms for fast block motion estimation," *IEEE Transactions on Multimedia*, vol. 7, pp. 16-22, Feb. 2005.

Lim, J. H. et al., "Adaptive motion estimation algorithm using spatial and temporal correlation," in *Proc. IEEE Pacific Rim Conference on Communications, Computers and signal Processing* 2001, pp. 473-476.

Ahmad, I. et al., "A fast adaptive motion estimation algorithm," *IEEE Trans. on Circuits and Systems for Video Technology*, vol. 16, pp. 420-438, Mar. 2006.

Ng, K. H. et al., "Search Patters Switching for Motion Estimation using Rate of Error Descent," in *Proceedings of International Conference on Multimedia & Expo*, Beijing, China, pp. 1583-1586, 2007.

Chen, Z. B. et al., "Fast Integer Pel and Fractional Pel Motion Estimation for JVT," in *JVT-F017, 6th Meeting: Awaji*, Island, Japan, Dec. 5-13, 2002.

I.-T.S. Q.6 and I. I. JTC1/SC29WG11, "Advanced video coding for generic audio visual services," *ITU-T Recommendation H. 264 | ISO/IEC International Standard ISO/IEC* 14496-10, May 2003.

"JVT H.264/AVC Reference Software Joint Model 9.6 (JM 9.6)," can be found at http://iphome.hhi.de/suehring/tml/download/old_jm/jm96.zip.

Goel, S. et al., "Muilti-path search algorithm for block-based motion estimation," in *Proceedings of IEEE International Conference on Image Processing*, Atlanta, USA, pp. 2373-2376, 2006.

Chen, Z. B. et al., "Fast motion estimation for JVT," in *JVT-G016, 7th Meeting*: Pattaya II, Thailand, Mar. 7-14, 2003.

* cited by examiner

One-at-a-Time Search

Block-based Gradient Descent Search

Multi-Path Search

Eight Direction Motion Estimation Search

Zero Motion Return

First Iteration of One-at-a-Time Search in Eight Directions

Second Iteration of One-at-a-Time Search in Eight Directions

Third Iteration of One-at-a-Time Search in Eight Directions

MOTION ESTIMATION METHOD

BACKGROUND OF THE INVENTION

1. Field of the Invention

The current invention relates to video compression and in particular to a motion estimation search method for a video coding.

2. Background Information

A video is a sequence of still images, called frames, representing a scene in motion. Often the only difference between successive frames in a video results from an object in the frame moving or the camera moving. Most of the image information in a frame is the same in the previous frame, but is moved to a different location within the frame. This characteristic can be used to compresses the amount of data needed to represent a video clip. Full image information is only stored for certain reference frames within the video clip. The reference frames are divided into a plurality of non-overlapping image blocks. The only information stored for non-reference frames are motion vectors which described the movement of image blocks relative to a reference frame. Say, for example, every fourth frame in a video clip is a reference frame then the amount of image information stored for the video clip could theoretically be reduced by 75%. This technique is widely adopted by video compression standards such as MPEG-1, MPEG-2, MPEG-4, H.261, H.263 and H.264/AVC.

Motion estimation is used to find the motion vectors that describe movement of image blocks in frames. In motion estimation a video frame is divided into non-overlapping block of equal size and the best-matched block from reference frames to that block in the current frame within a predefined search window is determined. A search method is used to move through the search window evaluating possible candidate blocks within the search window. Evaluation of best-match is normally performed by minimizing a block distortion measure (BDM) between the blocks, using well know techniques such as Mean Squared Error (MSE), Sum of Squared Errors (SSE), Mean Absolute Difference (MAD) or the Sum of Absolute Differences (SAD). SAD, for example, takes the absolute value of the difference between corresponding pixels in each block and sums the differences to create a simple metric of block similarity. SAD takes account of every pixel in the blocks and because of its simplicity it is extremely fast to calculate.

The most straightforward search method is referred to as the full search (FS), which exhaustively evaluates all possible candidate blocks within the search window. It has been estimated that the computation of FS could consume up to 70% of the total computation of the video encoding process. To overcome this problem a number of fixed search patterns have been proposed to speed up motion estimation. Examples of well-known search patterns include the one-at-a-time search (OTS), the three-step search (3SS) [2], the new three-step search (N3SS) [3], the four-step search (4SS) [4], the block-based gradient descent search (BBGDS) [5], the diamond search (DS) [6], and the hexagon-based search (HEXBS) [7], the cross-diamond search (CDS) [8] and the cross-diamond-hexagon search (CDHS) [9]. The 3SS, N3SS, 4SS and BBGDS all employ square search point patterns of different sizes to search for the best-matched block. The DS, HEXBS, CDS and CDHS employ one or more search point patterns from cross-shaped, diamond-shaped and hexagon-shaped to fit the center-biased characteristic of the motion vector distribution for achieving fewer search points and better prediction accuracy as compared with search methods using square-shaped pattern. These search methods could, however, be easily trapped by local minima as they primarily rely on the unimodal error surface assumption, which means matching error monotonically decreased towards global minimum. In most real-world sequences, local minimum points could spread over the search window especially for the sequences with complex motion contents. Thus, the performance of these fixed search patterns depends very much on the motion content of a video sequence. The BBGDS is suitable for slow motion blocks estimation while the 3SS is relatively more suitable for the estimation of fast motion blocks. The 4SS, DS, and HEXB could achieve better prediction accuracy for moderate motion blocks. The advanced methods of CDS, and CDHS could provide good prediction accuracy from slow to moderate motion blocks. Unfortuately, the real video sequences usually consist of wide-range motion contents and these fixed search patterns cannot provide satisfactory motion estimation results in these sequences. Search pattern switching has been proposed to solve this problem by adaptively using different search patterns among the 3SS, 4SS, DS and BBGDS for achieving higher prediction accuracy. However, the performance of these methods largely depends on the accuracy of the motion content estimators and some of these estimators are also quite complex in practical implementation.

Besides the initial search point pattern, it is also found that the initial minimum search point is very important. A hybrid unsymmetrical-cross multi-hexagon-grid search (UMHexagonS) [13] that takes advantage of many search patterns has been proposed in H.264/AVC [14] and adopted in the JM reference software [15]. In UMHexagonS, an unsymmetrical-cross search and an uneven multi-hexagon-grid are first performed over a wide range of search windows to determine a very good initial minimum point for leading a search path in the following steps using the extended hexagon-based search. UMHexagonS greatly outperforms FS in computation with up to 90% computational reduction while still maintaining good rate-distortion performance. However, the uneven multi-hexagon-grid search step is very computation extensive compared to other search steps in the UMHexagonS. A multi-path search (MPS) method [16] has also been proposed with use of more than one path to avoid using a wrong search path misled by the initial minimum search point. Basically, MPS is a multi-path BBGDS with multiple descending gradient paths. For each of the candidate paths, the compact square-shaped pattern of BBGDS is used. Although MPS could provide robust motion estimation accuracy its computational requirement is quite significantly increased especially for sequences with complex motions.

By way of background a brief explanation of OTS, BBGD and MPD will now be given.

One-at-a-Time Search (OTS)

The strategy of OTS is to keep searching along a particular search direction until the minimum point along that direction is found. If, for example, the current minimum BDM point is at the position (0, 1) and the upper-direction OTS is performed, then the point immediately above it, i.e. point (0, 2), will be searched. If point (0, 2) has lower distortion than point (0, 1), point (0, 2) will be set as the current minimum point. Point (0, 3), which is above point (0, 2), will then be searched. The search continues until the minimum point is closeted between two higher values, or until the search window boundary is reached. As OTS search follows the descending gradient path in a particular direction, it can be considered as a 1-D gradient descent search in that direction. This is an efficient searching strategy because it does not waste effort in probing into unknown terrain of the error surface. Moreover, it is also easily implemented in hardware and data access is very efficient because a search point is either horizontally or vertically adjacent to the previous search point.

The first OTS based block motion estimation method was proposed in 1985 by Srinivasan et al. [1] and employs the OTS strategy in the horizontal and then vertical direction. An example of OTS search path is shown in FIG. 1. The search window center and its two horizontally adjacent points, i.e. points at (0, 0), (−1, 0), and (1, 0), are evaluated first. If point (−1, 0), i.e. the left adjacent point of the search window center, has the lowest BDM, OTS is performed along the left direction from the search window center. If point (1, 0), i.e. the right adjacent point of the search window center, has the lowest BDM, OTS is performed along the right direction. OTS stops when the minimum BDM point is closeted between two points with higher BDM. This point is regarded as the lowest distortion point in the horizontal direction of the search window center, which is noted as (s, 0). The OTS in vertical direction is then performed using pint (s, 0) as the center. The BDM of points (s, 1) and (s, −1) are calculated. If point (s, 1) has lower distortion, OTS is performed in the upper direction from (s, 1). If point (s, −1) has lower distortion, OTS is performed along the lower direction. When the minimum BDM point is closeted between two points with higher distortions, the motion vector (MV) pointing to that point is returned. OTS method performs 1-D gradient descent search on the error surface twice. Although it uses fewer search points compared with other fast block motion estimation methods, its prediction quality is low. This is because 1-D gradient descent search is insufficient to provide a correct estimation of the global minimum position.

Block-Based Gradient Descent Search (BBGDS)

BBGDS [5] was proposed by Liu et al in 1996. It is a 2-D gradient descent search. An example of BBGDS search path is shown in FIG. 2. The BDM of the search window center point and its eight adjacent points are determined. If a lower distortion point is found among the eight points, that point will be the next search center. The BDM of any new adjacent points around the new center are determined and the center moves to the point with the lowest distortion. The procedure is repeated until a center point is enclosed by eight adjacent points all with higher BDMs. The motion vector pointing to this final center point is returned. The eight adjacent points which BBGDS searches correspond to the eight directions, i.e. the upper, lower, left, right, upper-left, upper-right, lower-left, and lower-right directions of the search center. They cover all the possible directions from the search center. In other words, BBGDS performs a small-scale 2-D gradient descent search and then one-at-a-time moves towards the global minimum following a descending gradient path. BBGDS has a much better prediction quality in terms of PSNR than OTS method. Although BBGDS performs better than OTS, it is also easily trapped in a local minimum near the initial search window center, because it selects only one among the eight search points adjacent to the currently lowest distortion point as the next search center of the next 2-D gradient descent search. When there is more than one descending gradient path, BBGDS will select only one path and may therefore be distracted to a local minimum instead of finding the global minimum.

Multi-Path Search (MPS)

The MPS method was proposed by Goel et al in 2006 [16]. Basically, MPS is a BBGDS that searched multiple descending gradient paths. For each of the candidate paths, the compact square-shaped search point pattern of BBGDS is used. The method converges when there is no new descending gradient path found. The MPS method is illustrated in FIG. 3 and comprises the following steps.

Step 1—Calculate the BDM of the search window center and set its distortion value as MIN.

Step 2—Calculate the BDM of the eight adjacent points of the search window center. Mark the search points with distortion value lower than MIN as ANCHOR point. If no ANCHOR point is found, go to Step 5 with zero motion vector (ZMV); otherwise go to Step 3.

Step 3—Set MIN to the lowest distortion value amongst the ANCHOR points and go to Step 4.

Step 4—Around each of the ANCHOR points, calculate BDMs for 3 or 5 neighboring points depend on the position of the ANCHOR point. Any search point with distortion lower than MIN is marked as ANCHOR point. If no new ANCHOR point is found, go to Step 5; otherwise go back to Step 3.

Step 5—The search is completed. Return with the final motion vector.

The problem with MPS is that it is not efficient because it uses many points to search all candidate descending gradient paths.

SUMMARY OF THE INVENTION

It is an object of the current invention a motion estimation method that ameliorates some of the disadvantages of the aforementioned estimation methods and which may reduce estimation search time in certain images.

Accordingly, there is disclosed herein a motion estimation method uses a search start point and a plurality of search paths extending from the start point. The method finds an image point along the plurality of search paths that has a minimum comparison value with a reference image block. This image point with a minimum comparison value becomes the new search start point, with a plurality of new search paths extending from the new start point. The method then finds the image point along the plurality of new search paths that has a minimum comparison value with the reference image block. The cycle repeats until points on the search paths have comparison values higher than the start point.

3. The method of claim 1 wherein the initially defined search start point in step a) is the center of the search window.

The method is performed in a search window with the plurality of search paths extending outwardly from the start point towards the edges of the search window. The initial start point is preferably at the center of the search window and the plurality of search paths extending in linear upward, downward, leftward, rightward, and/or diagonal directions from the search start point.

at a time search method. One at a time searching is conducted along a direction provided each newly evaluated point has lower BDM than the previously evaluated point. When a higher BDM value is encountered the search in that direction stops. The minimum distortion found by each directional search is set as a directional minimum. After each direction has been searched the point with the lowest BDM value amongst the directional minimums is set as the new center point and the next search round starts at the point with the new center point. The proposed method is summarized below>

| | |
|---|---|
| Step 1: | Calculate the BDM of the search window center point and set its BDM value as CURRENT_MIN. |
| Step 2: | Search along each of the eight directional paths from the center point uses a one at a time search method until a newly evaluated point has a higher BDM than the previously evaluated point. Set the lowest BDM value in each direction as a respective one of eight DIRECTIONAL_MINs. If no point with DIRECTIONAL_MIN is found the current search center is the minimum point go to Step 4, otherwise go to Step 3. |
| Step 3: | Determine the lowest amongst the eight CURRENT_MINs and set this point as new center point and CURRENT_MIN. Repeat Step 2 with the updated center point and CURRENT_MIN. |
| Step 4: | Return with the final motion vector pointing to the current center point with the CURRENT_MIN. |

Searching along the plurality of paths uses a one at a time search method. At each step comparison is made between the search point and a reference point using method selected from a group consisting of Mean Squared Error (MSE), Sum of Squared Errors (SSE), Mean Absolute Difference (MAD) and the Sum of Absolute Differences (SAD).

To further speed up the motion estimation method searching along the search paths may stop and the method jump to the mew search start point if a minimum distortion value along any one of the search paths satisfies the threshold criteria.

BRIEF DESCRIPTION OF THE DRAWINGS

An exemplary form of the present invention will now be described by way of example only and with reference to the accompanying drawings, in which.

DESCRIPTION OF THE EXEMPLARY EMBODIMENTS

Figure 1:
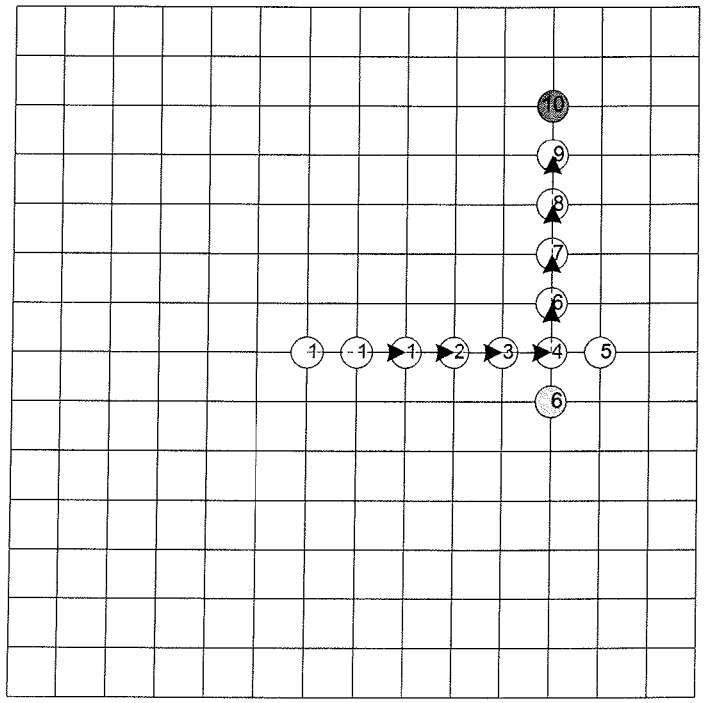
FIG. 1 schematically illustrates OTS.
Figure 2:
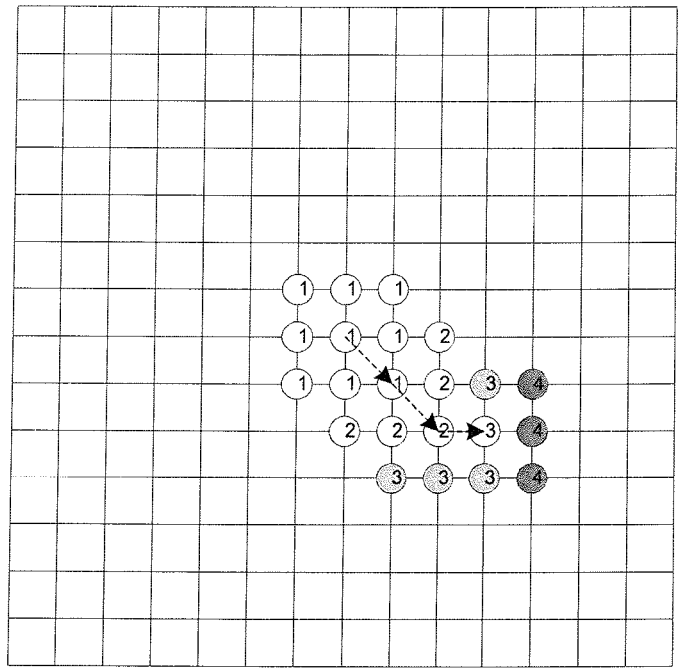
FIG. 2 schematically illustrates BBGDS.
Figure 3:
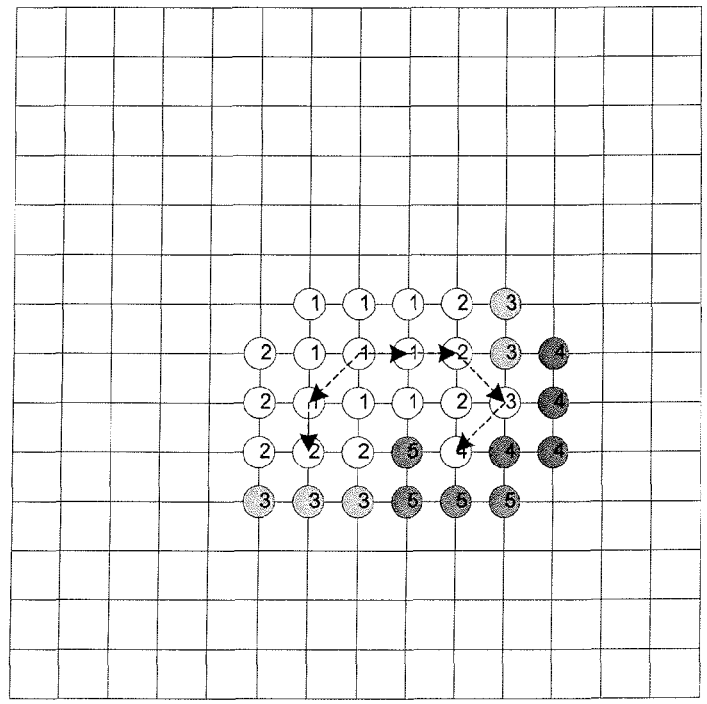
FIG. 3 schematically illustrates MPS.
Figure 4:
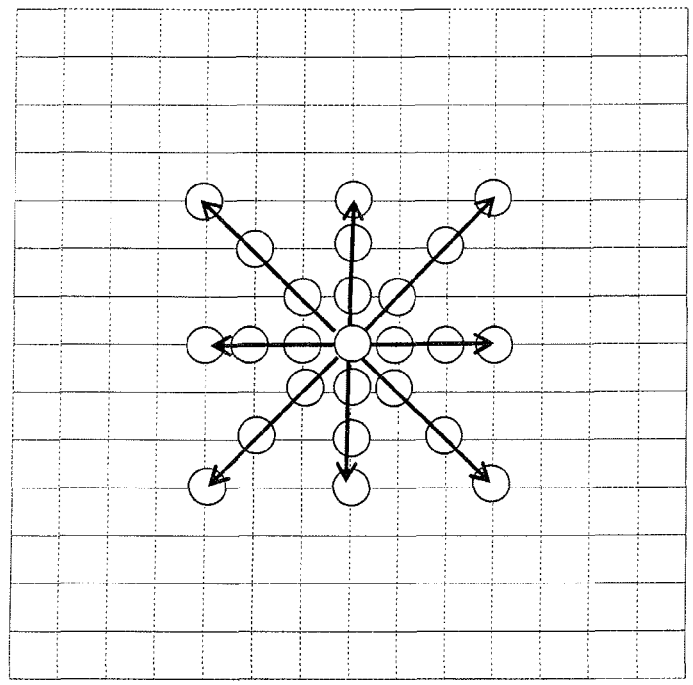
FIG. 4 schematically illustrates search directions of a motion estimation search method according to the invention.

Referring to FIG. 4, a motion estimation search method according to the invention independently searches eight directions, namely upper, lower, left, right, upper-left, upper-right, lower-left, and lower-right directions, of a current center point, which has a current minimum BDM value. The search along each of the eight directional searches uses a one at a time search method. One at a time searching is conducted along a direction provided each newly evaluated point has lower BDM than the previously evaluated point. When a higher BDM value is encountered the search in that direction stops. The minimum distortion found by each directional search is set as a directional minimum. After each direction has been searched the point with the lowest BDM value amongst the directional minimums is set as the new center point and the next search round starts at the point with the new center point. The proposed method is summarized below>

Figure 5:
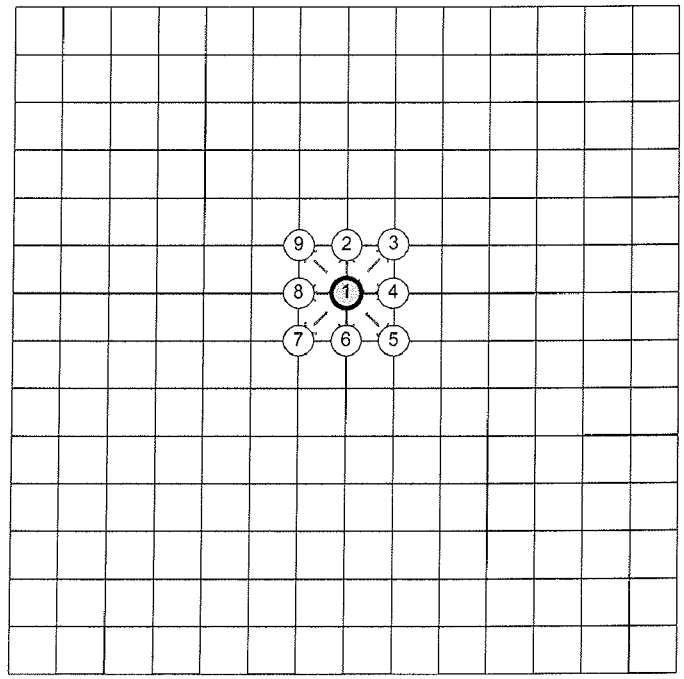
FIG. 5 schematically illustrates a first search using the search method.

An example of zero motion vector (ZMV) return from the method of the invention is shown in FIG. 5. The points 2, 3, 4, 5, 6, 7, 8, 9 in each of the eight directions has a higher BDM than center point 1, As the search window center point 1 is the minimum point there is no directional minimum point found in the first round of the step 2 and a zero motion vector is returned.

Figure 6:
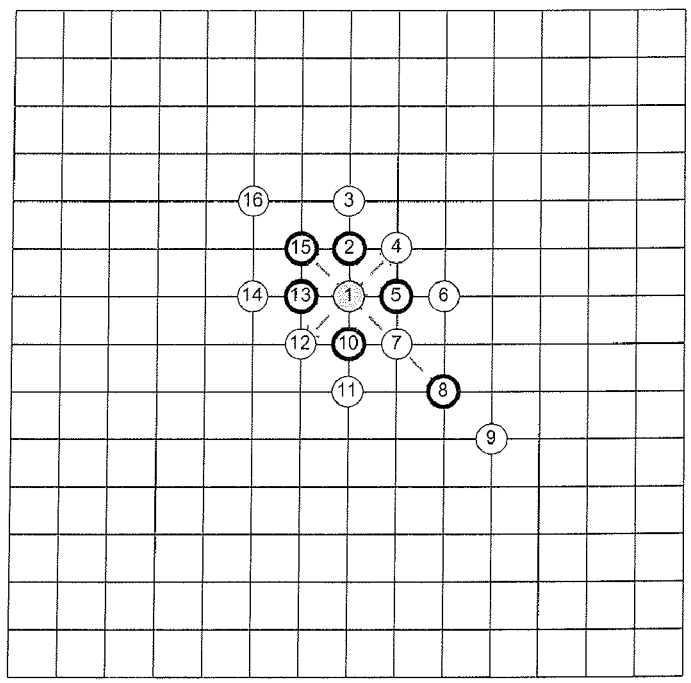
FIG. 6 schematically illustrates a first iteration of a second search using the search method, FIG. 7 schematically illustrates a second iteration of the second search, and FIG. 8 schematically illustrates a third iteration of the second search.
Figure 7:
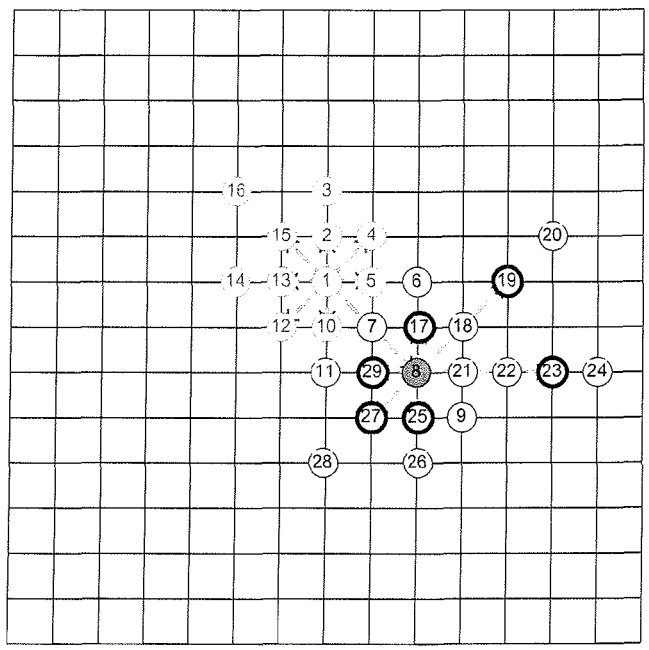
Figure 8:
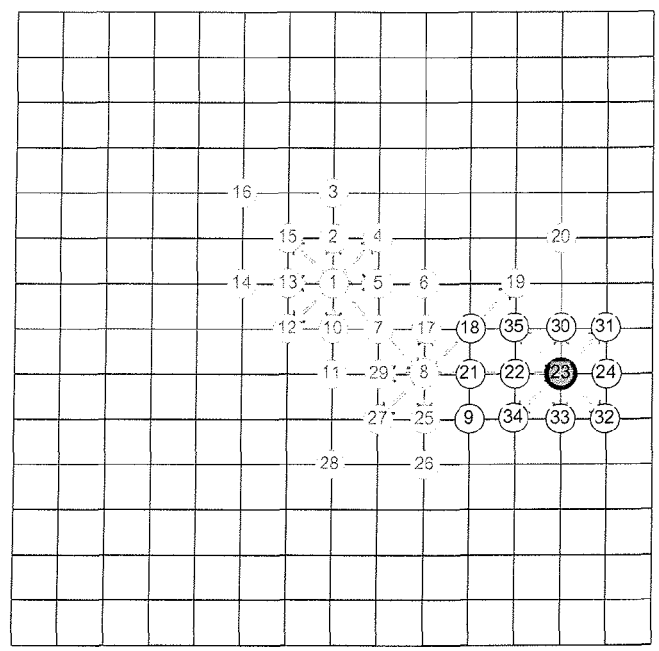

A search example comprising three iterations is shown in FIGS. 6 through 8. The original center is point 1. A one at a time search in each of the eight directions from point reveals directional minimum BDM values lower then point 1 in only 6 directions. These are points 2, 5, 8, 10, 13 and 15. The BDM value of these six points 2, 5, 8, 10, 13 and 15 represent respective directional minimums. Of the six directional minimums point 8 has the lowest BDM value and so becomes the new center point for the next iteration shown in FIG. 7. Referring to FIG. 7, a one at a time search in each of the eight directions from point 8 reveals directional minimum BDM values lower then point 8 in 6 directions. These are points 17, 19, 23, 25, 27 and 29. The BDM value of these six points 17, 19, 23, 25, 27 and 29 represent new respective directional minimums. Of the six directional minimums point 23 has the lowest BDM value and so becomes the new center point for the third iteration shown in FIG. 8. Referring to FIG. 8, a one at a time search in each of the eight directions from point 23 reveals that each point adjacent point 23 has a higher BDM and so point 23 is the minimum point and the search ends. The motion vector pointing to point 8 is returned by the motion estimation method.

As motion estimation search method searches each candidate descending gradient path, it performs better than BBGDS. In addition, it uses OTS to search these paths and so it requires fewer search points than MPS. The following Table compares BBGDS, MPS, and the search method of the invention (DGDS).

|        | Football |         | Coastguard |         | Akiyo  |         | Foreman |         | Sean   |         |
|--------|----------|---------|------------|---------|--------|---------|---------|---------|--------|---------|
|        | PSNR     | # of SPs| PSNR       | # of SPs| PSNR   | # of SPs| PSNR    | # of SPs| PSNR   | # of SPs|
| BBGDS  | 24.709   | 20.760  | 29.809     | 13.718  | 43.040 | 8.521   | 32.140  | 16.725  | 39.447 | 8.924   |
| MPS    | 24.945   | 31.619  | 29.858     | 15.875  | 43.040 | 8.598   | 32.270  | 23.246  | 39.450 | 9.281   |
| MDGDS  | 25.020   | 22.025  | 29.868     | 14.281  | 43.040 | 8.550   | 32.304  | 18.246  | 39.448 | 9.068   |

|        | News  |         | Silent |         | Stefan |         | Mobile |         | Container |         |
|--------|-------|---------|--------|---------|--------|---------|--------|---------|-----------|---------|
|        | PSNR  | # of SPs| PSNR   | # of SPs| PSNR   | # of SPs| PSNR   | # of SPs| PSNR      | # of SPs|
| BBGDS  | 36.660| 9.247   | 35.560 | 9.976   | 23.575 | 15.516  | 24.276 | 10.673  | 38.449    | 8.582   |
| MPS    | 36.706| 9.882   | 35.631 | 11.150  | 23.844 | 19.992  | 24.278 | 12.037  | 38.449    | 8.682   |
| MDGDS  | 36.722| 9.422   | 35.677 | 10.198  | 23.913 | 15.891  | 24.278 | 11.177  | 38.449    | 8.628   |

From this table, it can be found that DGDS has quality improvement in terms of PSNR over BBGDS. For example, the PSNR of DGDS is 0.338 dB higher than that of BBGDS for Stefan sequence. For the sequences of Football and Foreman, DGDS has 0.311 dB and 0.164 dB PSNR improvement over BBGDS, respectively. For other test sequences, it also has slight PSNR improvements over BBGDS. The number of search points DGDS uses is close to that of BBGDS. That means the computational complexity of DGDS is similar to that of BBGDS. DGDS also performs better than MPS. For all test sequences except Sean, DGDS uses fewer search points than MPS but achieves higher PSNR quality. The PSNR of DGDS is only 0.002 dB lower than that of MPS for sequence Sean. For other sequences DGDS achieves slightly higher PSNR quality than MPS. However, DGDS has huge speedup over MPS. For sequences Football, Foreman, and Stefan, DGDS is 30.34%, 21.51%, and 20.517% faster than MPS respectively. For small to medium motion sequences, the speed improvements of DGDS over MPS are less significant. For example in Coastguard, Silent, and Mobile, DGDS is 10.04%, 8.54%, and 7.14% faster than MPS respectively. Based on the above results, it is obvious that DGDS is a more efficient multiple paths gradient descent search method than MPS.

The method of the invention can be further improved. If one of the eight directional searches is found to have a directional minimum BDM value that is much lower than the current minimum distortion, other directional searches can be skipped to speedup the method. A new round of search can immediately start at that directional minimum BDM point. The relative distortion ratio (RDR) between a directional minimum distortion DIRECTIONAL_MIN and a current minimum distortion CURRENT_MIN is defined as:

$$-RDR = \frac{\text{DIRECTIONAL\_MIN}}{\text{CURRENT\_MIN}} \qquad \text{Equation 1}$$

If a directional search has an RDR lower than a threshold T, other directional searches could be skipped. The CURRENT_MIN point will be set to this DIRECTIONAL_MIN point and a new round of search will start around this center.

The procedures of FDGDS are as follows.

Step 1: Calculate the BDM of the search window center point and set its BDM value as CURRENT_MIN.
Step 2: Search along each of the eight directional paths from the center point uses a one at a time search method until a newly evaluated point has a higher BDM than the previously evaluated point. Set the lowest BDM value in each direction as a respective one of eight DIRECTIONAL_MINs.
After each directional search calculate the relative distortion ratio (RDR) of the directional search using Equation 1. If RDR < T, set CURRENT_MIN as this DIRECTIONAL_MIN and repeat Step 2; otherwise continue with other directional searches.
If no point with DIRECTIONAL_MIN is found the current search center is the minimum point go to Step 4, otherwise go to Step 3.
Step 3: Determine the lowest amongst the eight CURRENT_MINs and set this point as new center point and CURRENT_MIN. Repeat Step 2 with the updated center point and CURRENT_MIN.
Step 4: Return with the final motion vector pointing to the current center point with the CURRENT_MIN.

Experimental Results

To select a threshold for T and to compare the performance of method of the invention with other methods, simulations were conducted with the luminance components of a number of popular test video sequences. They consist of different degrees and types of motion contents. The MAD is used as the block distortion measure and block size is 16×16 pixels. The frame structure is (IPPP . . . ) and the search range is ±15 pixels. Simulation results are expressed in average number of search points used per block and average PSNR (peak signal-to-noise ratio) per frame of the tested sequences.

The threshold T controls the speed of convergence of the method. It is in the range of 0 to 1. For example, if it is set at 0.5, that means whenever the RDR is lower than 0.5, other directional searches will be skipped and a new round of search will start. This implies the directional minimum distortion is less than 50% of the current minimum distortion. Although setting the threshold T lower will speedup the convergence of the method, it will also degrade the prediction quality because it will lower the chance of finding the global minimum point. The impacts of using different threshold values can be found by experiment. Table III tabulates the average PSNR per frame and the average number of search points used per macro-block of FDGDS using different thresholds for fast convergence. From the results, it can be found that the number of search points together with the PSNR quality decrease with increasing threshold T. The higher the threshold T, the faster the convergence and therefore lower prediction quality as the method using lesser number of search paths. From Table III, it can be observed that T=0.5 is a good balance between speed and quality. Therefore T=0.5 is chosen as the threshold value in the FDGDS method.

TABLE III

Performance of FDGDS with different thresholds (T).

|   | Football | | Coastguard | | Akiyo | | Foreman | | Sean | |
|---|---|---|---|---|---|---|---|---|---|---|
| T | PSNR | # of SPs | PSNR | # of SPs | PSNR | # of SPs | PSNR | # of SPs | PSNR | # of SPs |
| 0.1 | 25.023 | 22.024 | 29.868 | 14.236 | 43.040 | 8.550 | 32.307 | 17.975 | 39.448 | 9.067 |
| 0.2 | 25.023 | 21.813 | 29.868 | 13.922 | 43.040 | 8.548 | 32.306 | 17.450 | 39.448 | 9.066 |
| 0.3 | 25.021 | 21.360 | 29.868 | 13.439 | 43.040 | 8.541 | 32.300 | 16.813 | 39.448 | 9.059 |
| 0.4 | 25.017 | 20.678 | 29.867 | 12.938 | 43.040 | 8.528 | 32.285 | 16.046 | 39.448 | 9.045 |
| 0.5 | 25.003 | 19.881 | 29.865 | 12.394 | 43.040 | 8.512 | 32.264 | 15.299 | 39.448 | 9.025 |
| 0.6 | 24.975 | 18.960 | 29.853 | 11.735 | 43.040 | 8.498 | 32.234 | 14.613 | 39.447 | 9.004 |
| 0.7 | 24.925 | 18.033 | 29.833 | 11.228 | 43.039 | 8.485 | 32.191 | 14.024 | 39.446 | 8.980 |
| 0.8 | 24.837 | 16.975 | 29.807 | 10.960 | 43.038 | 8.475 | 32.136 | 13.471 | 39.444 | 8.951 |
| 0.9 | 24.731 | 15.705 | 29.762 | 10.823 | 43.038 | 8.464 | 32.075 | 12.898 | 39.440 | 8.872 |

|   | News | | Silent | | Stefan | | Mobile | | Container | |
|---|---|---|---|---|---|---|---|---|---|---|
| T | PSNR | # of SPs | PSNR | # of SPs | PSNR | # of SPs | PSNR | # of SPs | PSNR | # of SPs |
| 0.1 | 36.722 | 9.424 | 35.677 | 10.198 | 23.913 | 15.681 | 24.278 | 11.142 | 38.449 | 8.628 |
| 0.2 | 36.722 | 9.403 | 35.677 | 10.171 | 23.913 | 14.993 | 24.278 | 10.958 | 38.449 | 8.628 |
| 0.3 | 36.721 | 9.318 | 35.676 | 10.083 | 23.912 | 14.200 | 24.278 | 10.640 | 38.449 | 8.628 |
| 0.4 | 36.716 | 9.195 | 35.673 | 9.960 | 23.912 | 13.613 | 24.278 | 10.191 | 38.449 | 8.628 |
| 0.5 | 36.710 | 9.099 | 35.664 | 9.811 | 23.911 | 13.195 | 24.278 | 9.815 | 38.449 | 8.628 |
| 0.6 | 36.704 | 9.025 | 35.645 | 9.667 | 23.904 | 12.894 | 24.278 | 9.515 | 38.449 | 8.628 |
| 0.7 | 36.697 | 8.965 | 35.620 | 9.537 | 23.886 | 12.598 | 24.277 | 9.285 | 38.449 | 8.628 |
| 0.8 | 36.682 | 8.905 | 35.589 | 9.419 | 23.844 | 12.250 | 24.276 | 9.078 | 38.449 | 8.628 |
| 0.9 | 36.661 | 8.836 | 35.553 | 9.297 | 23.735 | 11.808 | 24.274 | 8.880 | 38.449 | 8.602 |

Table IV shows the comparison between DGDS and FDGDS. It can be found that FDGDS has maximum 0.04 dB PSNR degradation over DGDS in Foreman. For other sequences the quality degradation is very slight or no degradation at all. However, FDGDS has significant speedup over DGDS. For sequences of Stefan and Foreman, FDGDS is 16.96% and 16.15% faster than DGDS respectively. For sequences of Coastguard, Mobile, and Football, FDGDS has a speedup of 13.22%, 12.19% and 9.73% respectively over DGDS.

TABLE IV

Performance comparison between FDGDS and DGDS.

|   | Football | | Coastguard | | Akiyo | | Foreman | | Sean | |
|---|---|---|---|---|---|---|---|---|---|---|
|   | PSNR | # of SPs | PSNR | # of SPs | PSNR | # of SPs | PSNR | # of SPs | PSNR | # of SPs |
| EGDS | 25.020 | 22.025 | 29.868 | 14.281 | 43.040 | 8.550 | 32.304 | 18.246 | 39.448 | 9.068 |
| EGDS(FC) | 25.003 | 19.881 | 29.865 | 12.394 | 43.040 | 8.512 | 32.264 | 15.299 | 39.448 | 9.025 |
| PSNR degradation over EGDS | −0.016 | | −0.003 | | 0.000 | | −0.040 | | 0.000 | |
| Speed improvement over EGDS | +9.73% | | +13.22% | | +0.44% | | +16.15% | | +0.47% | |

|   | News | | Silent | | Stefan | | Mobile | | Container | |
|---|---|---|---|---|---|---|---|---|---|---|
|   | PSNR | # of SPs | PSNR | # of SPs | PSNR | # of SPs | PSNR | # of SPs | PSNR | # of SPs |
| EGDS | 36.722 | 9.422 | 35.677 | 10.198 | 23.913 | 15.891 | 24.278 | 11.177 | 38.449 | 8.628 |
| EGDS(FC) | 36.710 | 9.099 | 35.664 | 9.811 | 23.911 | 13.195 | 24.278 | 9.815 | 38.449 | 8.628 |

TABLE IV-continued

Performance comparison between FDGDS and DGDS.

| PSNR degradation over EGDS | −0.012 | −0.012 | −0.002 | 0.000 | 0.000 |
|---|---|---|---|---|---|
| Speed improvement over EGDS | +3.43% | +3.80% | +16.96% | +12.19% | +0.00% |

Table V compares the performance of FDGDS with 3SS, N3SS, 4SS, BBGDS, MPS, HEXBS, DS, and CDS. They are all well-known and popular fast block motion estimation methods. In addition, the performance of FS is also included as reference. For sequences of Coastguard, Akiyo, News, Silent, Stefan, and Mobile, FDGDS is the fastest method among all the methods. For sequence of Football, Foreman, Sean, and Container, FDGDS is the second fastest method. For sequences with complex motion contents, FDGDS has a substantial speedup over the other well-known methods. For example for Stefan sequence, FDGDS has a speedup of 49.14% and 22.19% over 4SS and CDS respectively. Compare the matching quality in terms of PSNR of the methods; FDGDS achieves the highest PSNR for sequences of Akiyo, News, and Mobile. It has the second highest PSNR for sequences Football, Coastguard, Foreman, and Sean. Compare FDGDS with CDS for sequence Stefan, the PSNR of FDGDS is 0.041 dB lower than that of CDS. However, for sequences Foreman and Football, the PSNR of FDGDS is 0.25 dB and 0.175 dB higher than that of CDS respectively. From the results, it can be seen that FDGDS has high prediction quality but with much lower computational complexity compared with other methods. It is also very robust as it works well in all kinds of video sequences.

FDGDS is also implemented in the H.264 reference software "JVT H.264/AVC Reference Software Joint Model 9.6" (JM96) [15] to compare with 3SS, BBGDS, and the unsymmetrical-cross multi-hexagon-grid search (UMHexagonS) [13, 17], which is the FBMA adopted in JM96. UMHexagonS combines many techniques from different motion estimation research fields. For example it utilizes techniques in motion vector prediction and early termination researches. The configurations of the experimental setup are IPPPIPPP . . . frame structure, CAVLC, Hadamard transform, and one reference frame. RD optimization is turned off. Video sequences Foreman, Coastguard, A kiyo, Container, Stefan, and News are tested and 100 frames are used for each sequence. The sub-pel motion search is disabled so that the experimental results can clearly reflect the performances of the methods. Table VI compares FDGDS with UMHexagonS. The average PSNR (dB) and bit-rate (kbits/s) are used for video quality evaluation. The computational complexity is measured in the total motion estimation encoding time of JM96. From Table VI, it can be seen that FDGDS is much faster than UMHexagonS, with speedup from 14.4% in Akiyo to 41.17% in Coastguard. FDGDS also achieves nearly the same PSNR and bit-rate performance as UMHexagonS.

TABLE V

Performance comparison of FDGDS with conventional algorithms.

| | Football | | Coastguard | | Akiyo | | Foreman | | Sean | |
|---|---|---|---|---|---|---|---|---|---|---|
| | PSNR | # of SPs | PSNR | # of SPs | PSNR | # of SPs | PSNR | # of SPs | PSNR | # of SPs |
| FS | 25.844 | 858.455 | 30.035 | 868.333 | 43.044 | 868.333 | 32.842 | 868.333 | 39.461 | 868.333 |
| 3SS | 24.905 | 30.676 | 29.397 | 30.784 | 42.919 | 30.616 | 31.920 | 30.776 | 39.314 | 30.627 |
| N3SS | 24.902 | 26.315 | 29.372 | 19.344 | 43.014 | 15.912 | 32.033 | 21.973 | 39.445 | 16.371 |
| 4SS | 25.055 | 27.478 | 29.756 | 26.015 | 42.939 | 23.240 | 31.998 | 26.289 | 39.332 | 23.444 |
| BBGDS | 24.709 | 20.760 | 29.809 | 13.718 | 43.040 | 8.521 | 32.140 | 16.725 | 39.447 | 8.924 |
| MPS | 24.945 | 31.619 | 29.858 | 15.875 | 43.040 | 8.598 | 32.270 | 23.246 | 39.450 | 9.281 |
| HEXBS | 24.661 | 16.144 | 29.785 | 13.043 | 42.817 | 10.342 | 31.420 | 13.709 | 39.296 | 10.476 |
| DS | 24.881 | 22.179 | 29.879 | 16.707 | 43.025 | 12.268 | 32.096 | 18.266 | 39.423 | 12.573 |
| CDS | 24.828 | 21.502 | 29.879 | 15.682 | 43.011 | 8.700 | 32.014 | 16.686 | 39.408 | 9.151 |
| EGDS(FC) | 25.003 | 19.881 | 29.865 | 12.394 | 43.040 | 8.512 | 32.264 | 15.299 | 39.448 | 9.025 |

| | News | | Silent | | Stefan | | Mobile | | Container | |
|---|---|---|---|---|---|---|---|---|---|---|
| | PSNR | # of SPs | PSNR | # of SPs | PSNR | # of SPs | PSNR | # of SPs | PSNR | # of SPs |
| FS | 36.966 | 868.333 | 36.236 | 868.333 | 25.677 | 868.333 | 24.336 | 868.333 | 38.450 | 868.333 |
| 3SS | 36.607 | 30.618 | 35.845 | 30.619 | 24.042 | 30.763 | 23.948 | 30.636 | 38.449 | 30.633 |
| N3SS | 36.584 | 16.422 | 35.663 | 17.103 | 23.423 | 23.198 | 24.270 | 18.099 | 38.449 | 16.074 |
| 4SS | 36.699 | 23.539 | 35.882 | 23.755 | 24.619 | 25.942 | 24.028 | 23.698 | 38.449 | 23.337 |
| BBGDS | 36.660 | 9.247 | 35.560 | 9.976 | 23.575 | 15.516 | 24.276 | 10.673 | 38.449 | 8.582 |
| MPS | 36.706 | 9.882 | 35.631 | 11.150 | 23.844 | 19.992 | 24.278 | 12.037 | 38.449 | 8.682 |
| HEXBS | 36.546 | 10.665 | 35.563 | 10.960 | 23.932 | 13.873 | 23.999 | 10.847 | 38.449 | 10.420 |
| DS | 36.694 | 12.800 | 35.663 | 13.341 | 24.033 | 18.016 | 24.244 | 13.465 | 38.449 | 12.377 |
| CDS | 36.677 | 9.523 | 35.567 | 10.137 | 23.952 | 16.958 | 24.251 | 10.340 | 38.449 | 8.838 |
| EGDS(FC) | 36.710 | 9.099 | 35.664 | 9.811 | 23.911 | 13.195 | 24.278 | 9.815 | 38.449 | 8.628 |

TABLE VI

Performance comparison in H.264 reference software of FDGDS with 3SS, BBGDS, and UMHexagonS.

| | Foreman | | | Coastguard | | | Akiyo | | |
|---|---|---|---|---|---|---|---|---|---|
| | PSNR (dB) | bitrate (kbits/s) | run time (sec) | PSNR (dB) | bitrate (kbits/s) | run time (sec) | PSNR (dB) | bitrate (kbits/s) | run time (sec) |
| FS | 36.69 | 877.49 | 370.63 | 34.45 | 1896.58 | 373.88 | 40.00 | 404.33 | 371.86 |
| 3SS | 36.64 | 911.64 | 21.92 | 34.44 | 1899.68 | 22.12 | 39.97 | 404.84 | 21.88 |
| BBGDS | 36.65 | 892.93 | 12.03 | 34.45 | 1893.92 | 12.27 | 39.97 | 404.45 | 11.65 |
| UMHexagonS | 36.68 | 878.75 | 14.07 | 34.44 | 1892.34 | 17.43 | 39.99 | 404.38 | 10.27 |
| MDGDS(FC) | 36.64 | 892.80 | 9.96 | 34.44 | 1892.17 | 10.25 | 39.97 | 404.47 | 8.79 |
| MDGDS(FC) speedup over UMHS | | 29.20% | | | 41.17% | | | 14.40% | |

| | Container | | | Stefan | | | News | | |
|---|---|---|---|---|---|---|---|---|---|
| | PSNR (dB) | bitrate (kbits/s) | run time (sec) | PSNR (dB) | bitrate (kbits/s) | run time (sec) | PSNR (dB) | bitrate (kbits/s) | run time (sec) |
| FS | 36.50 | 849.14 | 372.36 | 35.22 | 2550.76 | 490.68 | 38.35 | 698.41 | 373.35 |
| 3SS | 36.49 | 849.10 | 21.81 | 35.21 | 2572.02 | 22.31 | 38.34 | 702.16 | 21.80 |
| BBGDS | 36.49 | 849.02 | 11.64 | 35.20 | 2574.13 | 12.24 | 38.34 | 699.30 | 12.02 |
| UMHexagonS | 36.49 | 851.35 | 11.54 | 35.21 | 2553.82 | 15.92 | 38.35 | 697.99 | 11.16 |
| MDGDS(FC) | 36.49 | 849.03 | 9.12 | 35.21 | 2563.62 | 10.16 | 38.34 | 698.90 | 8.98 |
| MDGDS(FC) speedup over UMHS | | 20.95% | | | 36.19% | | | 19.49% | |

REFERENCES

The following published documents are referred to in the description. The entire contents of each of the following published documents is incorporated herein by reference.

[1] R. Srinivasan and K. R. Rao, "Predictive coding based on efficient motion estimation," *IEEE Trans. Commun.*, vol. COM-33, pp. 888-896, August 1985.

[2] T. Koga, K. Iinuma, A. Hirano, Y. Iijima, and T. Ishiguro, "Motion compensated interframe coding for video conferencing," in *Proc. Nat. Telecommun, Conf, NO, L.A., November-December* 1981, pp. G5.3.1-G.5.3.5.

[3] R. Li, B. Zeng, and M. L. Lio, "A new three-step search algorithm for block motion estimation," *IEEE Trans. on Circuits and Systems for Video Technology*, vol. 4, pp. 438-443, August 1994.

[4] L. M. Po and W. C. Ma, "A novel four-step search algorithm for fast block motion estimation," *IEEE Trans. on Circuits and Systems for Video Technology*, vol. 6, pp. 313-317, June 1996.

[5] L. K. Liu and E. Feig, "A block-based gradient descent search algorithm for block motion estimation in video coding," *IEEE Trans. on Circuits and Systems for Video Technology*, vol. 6, pp. 419-422, August 1996.

[6] J. Y. Tham, S. Ranganath, M. Ranganath, and A. A. Kassim, "A novel unrestricted center-biased diamond search algorithm for block motion estimation," *IEEE Trans. on Circuits and Systems for Video Technology*, vol. 8, pp. 369-377, August 1998.

[7] C. Zhu, X. Lin, and L. P. Chau, "Hexagon-based search pattern for fast block motion estimation," *IEEE Trans. on Circuits and Systems for Video Technology*, vol. 12, pp. 349-355, May 2002.

[8] C. H. Cheung and L. M. Po, "A novel cross-diamond search algorithm for fast block motion estimation," *IEEE Trans. on Circuits and Systems for Video Technology*, vol. 12, pp. 1168-177, December 2002.

[9] C. H. Cheung and L. M. Po, "Novel cross-diamond-hexagonal search algorithms for fast block motion estimation," *IEE Transactions on Multimedia*, vol. 7, pp. 16-22, February 2005.

[10] J. H. Lim and H. W. Choi, "Adaptive motion estimation algorithm using spatial and temporal correlation," in *Proc. IEEE Pacific Rim Conference on Communications, Computers and signal Processing* 2001, pp. 473-476.

[11] I. Ahmad, W. Zheng, J. Luo, and M. Liou, "A fast adaptive motion estimation algorithm," *IEEE Trans. on Circuits and Systems for Video Technology*, vol. 16, pp. 420-438 March 2006.

[12] K. H. Ng, L. M. Po, and K. M. Wong, "Search Patterns Switching for Motion Estination using Rate of Error Descent," in *Proceedings of International Conference on Multimedia & Expo*, Beijing, China, 2007, pp. 1583-1586.

[13] Z. B. Chen, P. Zhou, and Y. He, "Fast Integer Pel and Fractional Pel Motion Estimation for JVT," in *JVT-F017, 6th Meeting: Awaji, Island, Japan, 5-13 Dec.* 2002.

[14] I.-T. S. Q.6 and I. I. JTC1/SC29/WG11, "Advanced video coding for generic audiovisual services," *ITU-T Recommendation H.264|ISO/IEC International Standard ISO/IEC* 14496-10, May 2003.

[15] "JVT H.264/AVC Reference Software Joint Model 9.6 (JM 9.6)."

[16] S. Goel and M. A. Bayoumi, "Multi-path search algorithm for block-based motion estimation," in *Proceedings of IEEE International Conference on Image Processing*, Atlanta, USA, 2006, pp. 2373-2376.

[17] Z. B. Chen, P. Zhou, and Y. He, "Fast motion estimation for JVT," in *JVT-G016, 7th Meeting: Pattaya II*, Thailand, 7-14 Mar. 2003.

What is claimed is:

1. A motion estimation method for video coding comprising:

a) defining, in a search window, a search start point and a plurality of search paths extending from the start point;

b) finding an image point along the plurality of search paths having a minimum comparison value with a reference image block by
   i) calculating an image distortion value at a point along the search path,
   ii) repeating step i) at successive points along the search path until an image distortion value at a point is higher than an image distortion value of an immediately preceding point, and
   iii) repeating steps i) and ii) for each search path; and
c) repeating steps a) and b), wherein the image point having the minimum comparison value defines a new search start point.

2. The method of claim 1 wherein steps a) and b) are repeated until the image point having the minimum comparison value is the search start point.

3. The method of claim 1 wherein the initially defined search start point in step a) is the center of the search window.

4. The method of claim 1 wherein the plurality of search paths extend outwardly from the start point towards the edges of the search window.

5. The method of claim 1 wherein the plurality of search paths extend in linear upward, downward, leftward, rightward, and/or diagonal directions from the search start point.

6. The method of claim 1 wherein finding the image point along the plurality of search paths employs a one-at-a-time search method.

7. The method of claim 6 wherein the comparison value is determined using a method selected from the group consisting of Mean Squared Error, Sum of Squared Errors, Mean Absolute Difference, and the Sum of Absolute Differences.

8. The method of claim 1 wherein calculating the image distortion value uses a method selected from the group consisting of Mean Squared Error, Sum of Squared Errors, Mean Absolute Difference, and the Sum of Absolute Differences.

9. The method of claim 1 further including, in step a), comparing a minimum image distortion value along a search path with threshold criteria and, if the minimum image distortion value along the search path satisfies the threshold criteria, proceeding straight to step c) without performing step b).

10. The method of claim 9 wherein the threshold criteria are that a ratio of the minimum image distortion value along the search path to an image distortion value of the search start point is below a threshold.

11. The method of claim 9 wherein the threshold is in a range from 0.3 to 0.8.

12. The method of claim 9 wherein the threshold is 0.5.

13. A motion estimation method for a video coding comprising:
   a) defining, in a search window, a search start point and a plurality of search paths extending from the start point,
   b) calculating an image distortion value at a point along the search path,
   c) repeating step b) at successive points along the search path until a distortion value at a point is higher than a distortion value of an immediately preceding point,
   d) repeating steps b) and c) for each search path, and
   e) repeating steps a) to d), wherein the image point having minimum image distortion value defines a new search start point.

* * * * *